United States Patent [19]

Leoni et al.

[11] 4,314,959
[45] Feb. 9, 1982

[54] PROCESS FOR THE PREPARATION OF REGENERATED CELLULOSE FORMED BODIES FROM SOLUTIONS OF CELLULOSE DERIVATIVES IN ORGANIC SOLVENTS

[75] Inventors: Roberto Leoni, Milan; Alberto Baldini, Garlasco; Angelo Calloni; Gianfranco Angelini, both of Buscate, all of Italy

[73] Assignee: SNIA Viscosa Societa' Nazionale Industria Applicazioni Viscosa S.p.A., Italy

[21] Appl. No.: 142,617

[22] Filed: Apr. 21, 1980

[30] Foreign Application Priority Data

Apr. 24, 1979 [IT] Italy .................. 22109 A/79

[51] Int. Cl.³ .................................................. D01F 2/00
[52] U.S. Cl. .................................. 264/187; 106/163 R; 264/196; 264/197
[58] Field of Search ............... 264/184, 196, 183, 197, 264/187; 106/163 R

[56] References Cited

U.S. PATENT DOCUMENTS

| 2,933,460 | 4/1960 | Richter et al. | 264/28 |
| 2,955,907 | 10/1960 | Kolb | 264/184 |
| 4,022,631 | 5/1977 | Turbak et al. | 186/168 |
| 4,086,418 | 4/1978 | Turbak et al. | 264/187 |
| 4,173,613 | 11/1979 | Rodier | 264/187 |
| 4,237,274 | 12/1980 | Leoni et al. | 106/163 R |

Primary Examiner—Jay H. Woo
Attorney, Agent, or Firm—Wenderoth, Lind & Ponack

[57] ABSTRACT

A process for the preparation of regenerated cellulose shaped bodies from spinning dopes comprising solutions of methylol derivatives of cellulose in organic solvent selected from dimethylformamide, dimethylacetamide, dimethylsulphoxide and N-methyl-pyrrolidone is described. The cellulose derivative is coagulated from the spinning dope in a coagulating bath, the main component of which is a high-boiling alcohol capable of reacting with the free (para)formaldehyde and with the bound (para)formaldehyde of the methylol derivative to a degree varying with the temperature. It is possible to prepare filaments and yarns having excellent characteristics by starting from solutions having high $CH_2O$ and cellulose concentrations and high MS ratios.

15 Claims, 1 Drawing Figure

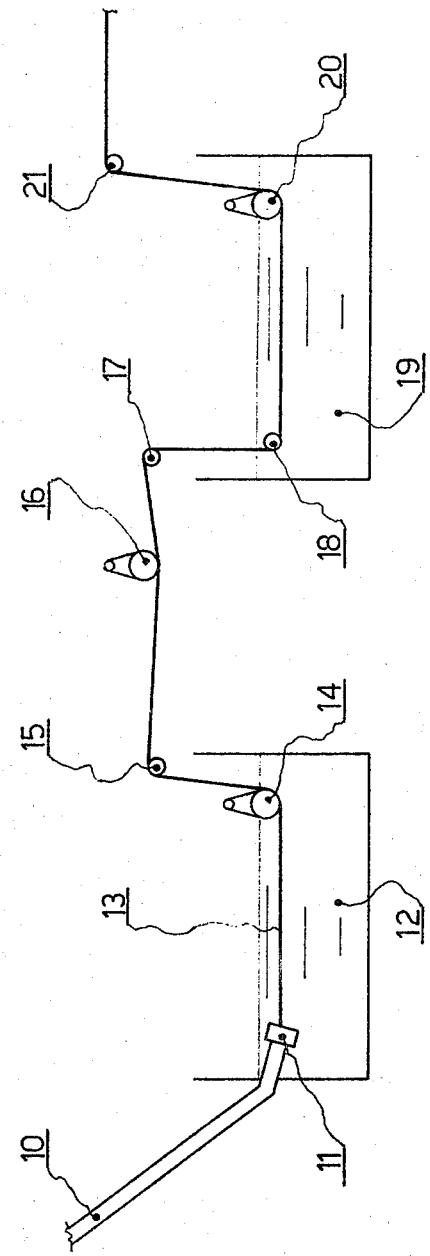

PROCESS FOR THE PREPARATION OF REGENERATED CELLULOSE FORMED BODIES FROM SOLUTIONS OF CELLULOSE DERIVATIVES IN ORGANIC SOLVENTS

BACKGROUND OF THE INVENTION

In British Pat. No. 2,026,934 A of the same Applicant, a process has been described for the preparation of regenerated cellulose formed bodies from solutions of cellulose derivatives in organic solvents, which process comprises precipitating the cellulose derivative from its solution in a coagulating bath, the main component of which is an organic liquid which does not dissolve and does not regenerate the cellulose, and subsequently drawing and regenerating the coagulated body in successive baths. The cellulose derivatives in question are generally designated as "methylol derivatives" and their chemical nature is discussed in the aforesaid specification, in which numerous cellulose non-solvents, non-regenerating agents are also listed, among them the alcohols and preferably methanol. The solvents of the cellulose derivative solution are dimethylsulphoxide (DMSO), dimethylformamide (DMF), dimethylacetamide (DMAC) and N-methylpyrrolidone.

If a good coagulation from the solvents described above is to be obtained, the formaldehyde content of the solution, and therefore the $CH_2O$/cellulose ratio, should not exceed certain limits, e.g., if the solvent is DMSO, the limits should be, as expressed by an MS ratio (which is the molar ratio of the $CH_2O$ units that can be titrated by the sodium sulphite method to the anhydroglucosidic units of the cellulose), close to 1, and consequently low $CH_2O\%$ contents and cellulose contents which do not reach 6%, in the solutions. (All percentages in this description are by weight).

SUMMARY OF THE INVENTION

The process according to the present invention permits the preparation of shaped bodies, in particular filaments and yarns, having much better characteristics than those produced by the known methods, by starting from solutions having higher $CH_2O$ and cellulose concentrations and MS ratios than those permissible in the aforesaid, prior art process. More specifically, the $CH_2O$ concentrations are preferably between 2 and 15%, the cellulose concentrations are preferably between 7 and 15%, and the MS ratio (ratio of $CH_2O$ units to cellulose anhydroglucosidic units) is higher than 1, and preferably substantially higher, even as high as 7.

The process according to the present invention also permits one to obtain, if desired, a partial regeneration—even to a high degree—of the cellulose when its methylol derivative is precipitated in the coagulating bath, as well as to vary the degree of said regeneration at will, within wide limits, by controlling the operative conditions under which the coagulation occurs, the regeneration being thereafter completed—if needed—in a manner known per se, in particular by treating the coagulated filaments with aqueous baths at convenient temperatures. Thus the process affords an optimal control of the characteristics of the yarns produced, as a result of controlling the regeneration of the cellulose and gradually effecting it, in the coagulation and following stages, and more or less in any given stage, as may be desired and useful.

The aforesaid results, and others which will appear from the description, are achieved by the process which is the subject matter of the invention, which is characterized in that a coagulating bath is employed having as its main component a high boiling alcohol, capable of reacting, to a degree which varies with the temperature, with the free (para)formaldehyde and with the (para)formaldehyde included in a combined state in the cellulose methylol derivative.

DETAILED DESCRIPTION OF THE PREFERRED EMBODIMENTS

The aforesaid alcohols precipitate the cellulose methylol derivative, and transform it into regenerated cellulose, to a degree depending, for each specific alcohol, on the temperature, the other conditions (such as the duration of the contact between the alcohol and the methylol derivative) being equal. More precisely, the degree of regeneration increases with the temperature. Said alcohols are non-solvents of the cellulose. At a low, e.g. room, temperature, they have a limited regenerating action, or more at all and their regenerating power appears and/or increases as the temperature rises, and at a high enough temperature, may, in some cases, become so high that the regeneration is practically complete. Preferably the coagulation of the solution takes place at temperatures at which the regeneration of the cellulose is only partial. The regeneration must then be completed, preferably by contact with aqueous baths. The coagulation temperatures are preferably between 60° C. and the boiling point of the solvent of the methylol derivative, which is, e.g., 153° C. for DMF and 166° C. for DMAC. Mixtures of said alcohols with others compounds, in particular water, may also be used as coagulating and regenerating baths, and in such way the regenerating power of the alcohols is increased. The baths may also contain a certain amount of solvent of the methylol derivative solution.

Among the high boiling alcohols employed according to the invention, polythylene glycol (PEG) is particularly preferred, which is a liquid which does not dissolve and does not regenerate the cellulose in the cold, but regenerates it in the hot, more or less rapidly depending on the temperature.

As is known, PEG is produced with different molecular weights, and has different physical characteristics depending on its molecular weight. According to the present invention, it is preferred to employ PEGs which are liquid at room temperature, viz. which have molecular weights in the order of a few hundred, e.g. 200–400. However this is not essential, as it is sufficient that the coagulating bath be liquid under the process conditions, and therefore, if the bath is pure or almost pure PEG, that this latter should have such a molecular weight as to be liquid under the temperature conditions employed, or, if a mixture of PEG with other compounds is used e.g.—as is preferable—a mixture of PEG, solvent of the methylol derivative and a small amount of water, said mixture should be liquid.

After the coagulation, the formed bodies are drawn, in a manner known per se.

According to a variant of the invention, the stretching is carried out, completely or to a predominant degree, in air. This affords a better regularity of the process and better characteristics of the finished product.

The process according to the present invention permits one to obtain regularity in coagulation and regeneration and in general in the entire process; the characteristics of the finished products, in particular filaments and yarns, are good and controllable and the process is perfectly suited to industrial operation.

The characteristics of the invention will be better understood from the following non-limitative examples, with reference to the attached drawing which schematically illustrates the process for obtaining yarns from cellulose derivative solutions.

In the drawing, the viscous cellulose derivative solution or spinning dope, passes, through a pipeline 10, a spinnerette 11 which is immersed in a coagulating bath 12. The yarn 13, which is formed in the coagulating bath, is taken up by the godet 14 (constituted by a larger and a smaller roller). Subsequently the yarn is stretched in air (or, in some embodiments, in water as well) and is taken up by the godet 16 which has a peripheral speed greater than that of godet 14, suitable means for deviating the path of yarn 13 being optionally provided, as schematically indicated by small roller 15 in the drawing.

Subsequently, the yarn 13 optionally passes over similar deviating means 17, and penetrates into regenerating and washing bath 19, in which it travels from a guide roller 18 (which might be substituted by a godet) to a godet 20; therefrom it proceeds, optionally through other guide means schematically represented by a roller 21, to subsequent treatments. Said treatments will require in general the passage of the yarn through further wash baths, and optionally further stretching stages.

A number of illustrative but not limitative embodiments of the invention will now be described.

EXAMPLE 1

A spinning dope is prepared by heating, in a closed, completely heated vessel, a suspension of 100 parts of a prehydrolyzed Kraft pulp, 230 parts of commercial paraformaldehyde, and 924 parts of N,N'-dimethylacetamide (DMAC), at 130°–140° C. for about 1 hour and then condensing a part of excess formaldehyde as paraformaldehyde and some DMAC for about 1 hour and 50 minutes in a cooled vessel connected with the heated vessel. The concentration of the cellulose in the spinning dope is about 10% and the concentration of the $CH_2O$ units is 8.5% by weight.

The solution, which is at a temperature of 50° C., is extruded through gold/platinum spinnerets having 160 orifices with a diameter of 80 micron, into a coagulating bath essentially constituted by PEG 300 (having an average molecular weight between 285 and 315 approximately) and maintained at the temperature of 90° C. The coagulated filaments are taken up at the speed of 8,5 mt/min, which is the peripheral speed of godet 14 of the drawing. Subsequently the filaments are stretched in air, by means of a godet (16 in the drawing) having a peripheral speed of 25 mt/min. From this point on the filaments could be subjected to further stretching, but in the example which is being described this does not occur and the other godets, such as godet 20 in the drawing, have the same speed as godet 16, viz. 25 mt/min. The total stretching, therefore, is about 300%.

After stretching, the yarn travels through water washing baths at a temperature of 25° C., in which baths the regeneration of the cellulose is completed. The washing baths may be, and generally will be, more than one, the condition being the same in all of them or the temperature being suitably varied from one to the other. The yarn is collected in the wet state on bobbins and is washed again with water at 70°–80° C. until only traces of $CH_2O$ remain on the yarn.

The yarn has the following characteristics:

| Count (den/filament) | | 1.58 |
|---|---|---|
| Tenacity (gr/den): | conditioned | 1.77 |
| | wet | 1.07 |
| Elongation at break (%): | conditioned | 28.1 |
| | wet | 40.5 |
| Hook tenacity (gr/den) | | 0.8 |
| Transverse cross-sections: | | rounded |

EXAMPLE 2

The operations are carried out as in Example 1, except that the amounts of cellulose, paraformaldehyde, and DMAC are 108, 250 and 924 respectively, and the coagulating bath is constituted by a mixture of PEG, DMAC and water. The numerical data of this Example are tabulated hereinbelow.

| Spinning dope | | |
|---|---|---|
| Solvent: DMAC | | |
| Cellulose concentration in the dope | = | 10.5% |
| $CH_2O$ concentration in the dope | = | 9.5% |
| Spinning | | |
| Gold/platinum spinnerets having 160 orifices with a diameter of 80 micron | | |
| Temperature of dope: | | 50° C. |
| Coagulating bath at 75–85° C.: | | 60% PEG 300 / 30% DMAC / 10% $H_2O$ |
| Washing bath: $H_2O$ | at | 50° C. |

Speed of godet 14 (take-up): 2.50 mt/min
Speed of godet 16 (stretching in air): 10 mt/min
Speed of godet 20 (wet stretching and washing): 10.5 mt/min
Total stretching: 420%

As is seen, a moderate wet stretching is added to the stretching in air.

The characteristics of the yarn, after a further washing at 70° C. with $H_2O$ until the $CH_2O$ has been completely eliminated, and after drying, are substantially the same as those of yarn of Example 1.

EXAMPLE 3

The operations of Example 1 are repeated, using the same amounts of cellulose, paraformaldehyde and DMAC, but reducing the time of elimination of excess formaldehyde to about 1 hour. The numerical data are tabulated hereunder:

| Spinning dope | |
|---|---|
| Solvent: DMAC | |
| Cellulose concentration in the dope: | 9.5% |
| $CH_2O$ concentration in the dope: | 11.41% |
| Spinning | |
| Spinnerets: gold/platinum having 160 orifices with a diameter of 80 micron | |
| Temperature of dope: | room temperature |
| Coagulating bath: | PEG 300 at 80–90° C. |
| Washing bath: $H_2O$ | at about 25° C. |

Speed of godet 14 (take-up): 2.5 mt/min
Speed of godet 16 (stretching in air): 13.2 mt/min
Speed of godet 20 (washing): 13.2 mt/min
Total drawing: 530%

The characteristics of the yarn are substantially the same as in Example 1.

EXAMPLE 4

In this Example the spinning solvent is different from that of the preceding Examples and the stretching is effected in the wet state, viz. the segment of yarn from godet 14 to godet 16 of the drawing is to be considered as immersed, at least to a substantial extent, in an aqueous bath. The dope is prepared by heating 44 parts of cellulose, 61 of paraformaldehyde, and 700 of dimethylsulphoxide at 130° C. fir 3 hours and then eliminating the excess formaldehyde under vacuum at 80° C. for 2 hours. The numerical data of the Example are tabulated hereunder:

Spinning dope

Solvent: DMSO (dimethylsulphoxide)
Cellulose concentration in the dope: 5.64%
$CH_2O$ concentration in the dope: 2.0%

Spinning

Gold/platinum spinnerets having 160 orifices with diameter of 80 micron
Temperature of the dope: 40° C.
Coagulating bath: PEG 300 at 90°–100° C.
Stretching bath: $H_2O$ at about 25° C.
Washing bath: $H_2O$ at about 25° C.
Speed of godet 14 (take-up): 4.2 mt/min
Speed of godet 16 (wet stretching): 11 mt/min
Speed of godet 20 (washing): 11 mt/min
Total stretching: 260%

The yarns thus obtained are collected on bobbins and washed with $H_2O$ at 70°–80° C. until $CH_2O$ has been eliminated.

EXAMPLE 5

A spinning dope, prepared according to the method described in Example 1 and having the following composition:
Cellulose concentration: 10.6%
$CH_2O$ concentration: 7.5%
Viscosity at 20° C. ($\eta_{20}$): 5300 poise is spun under the following conditions:
Dope temperature: 20°–40° C.
Composition of coagulating bath: PEG/DMAC 60/40
Length of coagulating bath: 80–100 cm
Temperature of coagulating bath: 60°–80° C.
Spinnerets used: gold-platinum and Aisi 430 steel spinnerets with 120 orifices having a diameter of 80 micron-160 orifices having a diameter of 80 micron.
Total drawing: 50–100% partially in air and partially in $H_2O$ during the washing stages
Washing and regeneration: $H_2O$, 40°–80° C., countercurrent
Post treatment: urea solution and finishing
Collecting speed: 25–30 mt/min.

The textile characteristics of the yarn thus obtained are as follows:

| Tenacity (gr/den): | conditioned | 2.4–2.6 |
| --- | --- | --- |
| | wet | 1.3–1.5 |
| Hook tenacity (gr/den) | | 0.5–0.7 |
| Count (den/filament) | | 1.4–1.6 |

We claim:

1. A process for the preparation of a shaped regenerated cellulose body from a spinning dope comprising a solution of methylol derivatives of cellulose in an organic solvent selected from the group consisting of dimethylformamide, dimethylacetamide, dimethylsulphoxide and N-methyl-pyrrolidone, followed by coagulation in a coagulating bath, wherein the coagulation bath contains, as its main component, a high boiling alcohol capable of reacting with free formaldehyde and with the bound (para) formaldehyde of the methylol derivative, to a degree which varies according to the temperature.

2. The process according to claim 1, wherein the coagulation of the cellulose derivative is effected at a temperature at which the alcohol has a significant capability of reacting with the (para) formaldehyde, whereby the shaped body is produced concurrently with a partial regeneration of the cellulose, and said regeneration being completed by subsequent contact of the shaped body with at least one further regenerating bath.

3. The process according to claim 2, wherein the further regenerating baths are aqueous baths.

4. The process according to claim 2, wherein the coagulation is effected at a temperature between 60° C. and the boiling point of the solvent of the methylol derivative.

5. The process according to claim 1, wherein the high boiling alcohol is a polyethylene glycol.

6. The process according to claim 5, wherein the polyethylene glycol is liquid under coagulation conditions.

7. The process according to claim 6, wherein the polyethylene glycol is liquid at room temperature.

8. The process according to claim 1, wherein the spinning dope has a $CH_2O$ content between 2 and 15% by weight.

9. The process according to claim 1, wherein the spinning dope has a cellulose content between 7 and 15% by weight.

10. The process according to claim 8, wherein the spinning dope has a ratio of $CH_2O$ units to anhydroglucosidic units of the cellulose from above 1 to 7.

11. The process according to claim 1, wherein a mixture of high boiling alcohol, solvent of the cellulose derivative solution, and water, is used as coagulating bath.

12. The process according to claim 1, wherein the organic solvent of the cellulose derivative solution is dimethylacetamide.

13. The process according to claim 1, wherein the shaped body is stretched after coagulation.

14. The process according to claim 13, wherein the stretching of the formed body takes place in air, to a substantial degree.

15. The process according to claim 1 wherein the shaped body is a filament.

* * * * *